B. J. SVENSON.
Improvement in Cultivators.
No. 130,765.
Patented Aug. 20, 1872.
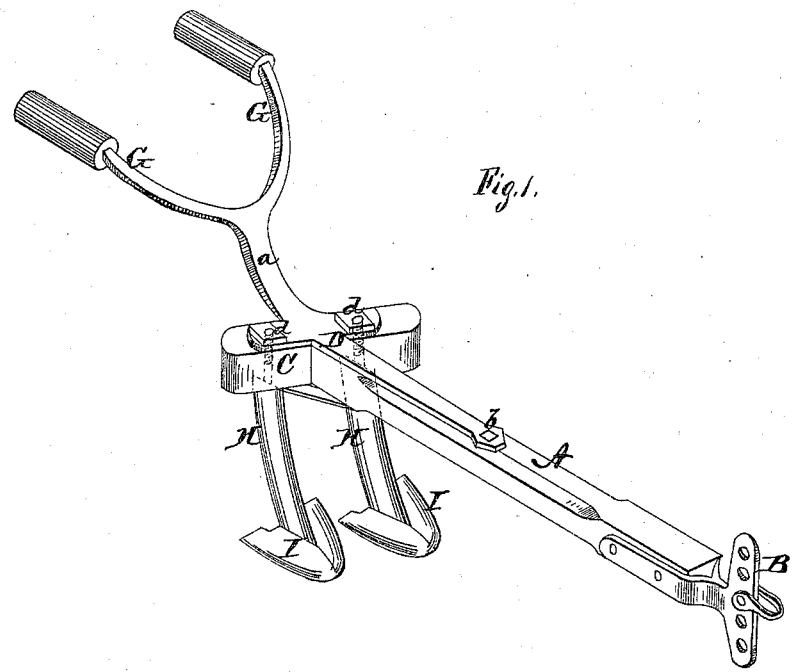
Fig.1.
Fig.2.
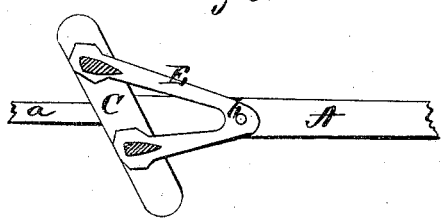
Witnesses
Inventor
Bengt Johan Svenson
per
Alexander Mason
Attorneys.

UNITED STATES PATENT OFFICE.

BENGT JOHAN SVENSON, OF MANOR STATION, TEXAS.

IMPROVEMENT IN CULTIVATORS.

Specification forming part of Letters Patent No. 130,765, dated August 20, 1872.

*To all whom it may concern:*

Be it known that I, B. J. SVENSON, of Manor Station, in the county of Travis, and in the State of Texas, have invented certain new and useful Improvements in Double-Sweep Plows; and do hereby declare that the following is a full, clear and exact description thereof, reference being had to the accompanying drawing and to the letters of reference marked thereon making a part of this specification.

The nature of my invention consists in the construction and arrangement of a "double-sweep plow," as will be hereinafter more fully set forth.

In order to enable others skilled in the art to which my invention appertains to make and use the same, I will now proceed to describe its construction and operation referring to the annexed drawing, in which—

Figure 1 is a perspective view of my machine, and Fig. 2 is a bottom view of a part of the same.

A represents the beam, provided at its front end with the graduating clevis B to regulate the depth at which the machine is to work. At the rear end of the beam A is attached a cross-bar, C, in an inclined position, as shown in the drawing. This cross-bar is firmly braced and united to the beam by means of a top casting, D, and bottom-casting, E. The top-casting D is somewhat in T-shape, with an arm, *a*, extending upward and rearward from the center, which arm is forked, forming the handles G G. The bottom casting E is V-shaped, as shown in Fig. 2. The front ends of the two castings D E are fastened to the beam A by one bolt, *b*, and the ends of the castings are fastened to the cross-bar C by the upper ends of the shanks H H passing through the same, and nuts *d d* screwed upon their upper ends. The shanks H H are made of iron, with sharp edges on the front, and provided at their lower ends with shovels I I, which are rounded, as shown, and convex on their upper surfaces. These shovels are intended to be attached by bolts and screws to the shanks.

This implement is used, in the cultivation of corn and cotton, to clean out the middles and to chop out or remove the grass and weeds.

Having thus fully described my invention, what I claim as new, and desire to secure by Letters Patent, is—

The combination of the beam A, cross-bar C, strap D, forming the handles G G, V-shaped strap E, and the shovel-standards H H, passing through the straps D and E, and cross-bar C, all substantially as set forth.

In testimony that I claim the foregoing I have hereunto set my hand this 23d day of May, 1872.

BENGT JOHAN SVENSON.

Witnesses:
J. W. HOWARD,
S. W. PALM.